(No Model.)
J. E. HUNTER.
FRICTION CLUTCH PULLEY.
No. 361,629. Patented Apr. 19, 1887.
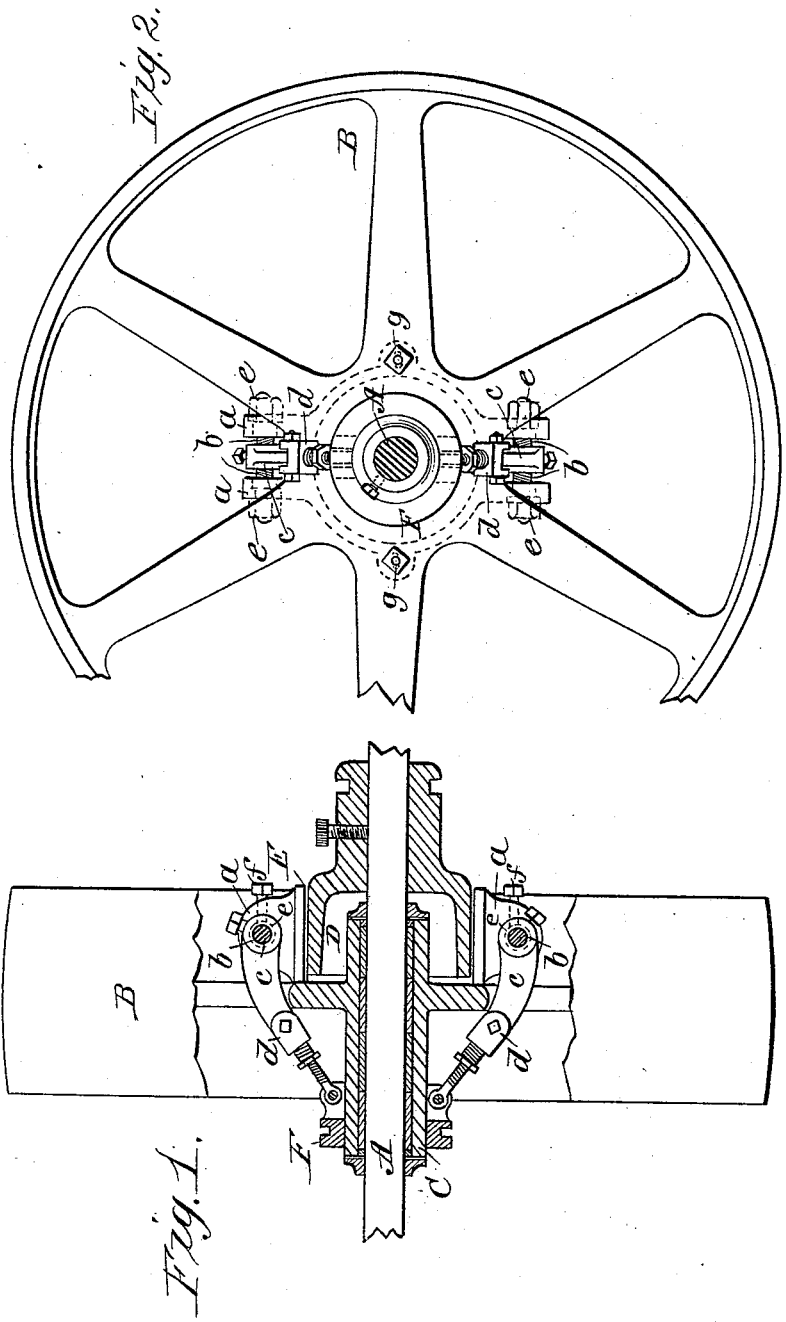

UNITED STATES PATENT OFFICE.

JAMES E. HUNTER, OF NORTH ADAMS, MASSACHUSETTS.

FRICTION-CLUTCH PULLEY.

SPECIFICATION forming part of Letters Patent No. 361,629, dated April 19, 1887.

Application filed April 27, 1886. Serial No. 200,283. (No model.)

*To all whom it may concern:*

Be it known that I, JAMES E. HUNTER, of North Adams, in the county of Berkshire and State of Massachusetts, have invented a new and useful Improvement in Friction-Clutch Pulleys, of which the following is a specification, reference being had to the annexed drawings, forming a part thereof, in which—

Figure 1 is a front elevation, partly in section, of a friction-pulley embodying my invention. Fig. 2 is an end elevation.

Similar letters of reference indicate corresponding parts in both figures of the drawings.

The object of my invention is to provide a friction-pulley in which the clamping and clutching devices which cause the pulley to be set in motion by the shaft will be detached from the shaft when the pulley is stopped, and will permit the shaft to revolve in the clutching devices as well as in the pulley.

My invention consists in a friction-drum secured to the shaft and a pulley placed loosely on the shaft and carrying a split band which embraces the friction-drum, and a sliding collar placed on an elongation of the hub of the wheel and connected with the friction-band-tightening levers, as hereinafter more fully described.

In my drawings I have shown one method of carrying out my invention; but I do not limit or confine my invention to this method, as there are various ways of arranging the mechanical details.

Upon the shaft A is loosely mounted the pulley B, which is provided with an elongated hub, C, and with any suitable anti-friction lining. A drum, D, secured to the shaft and projecting over one end of the hub C, is surrounded by a split band, E, each half of which is connected with the web of the pulley by a bolt or threaded stud, $g$, extending through a short radial slot in the pulley-web. Each half of the split band is provided with ears $a$, which are apertured for receiving the nuts $e$, which are clamped in the apertures of the ears by set-screws $f$, the nut in the ears of adjoining ends of the band being threaded, one with a right-hand thread, the other with a left-hand thread, and in the nuts $e$ are placed the right and left hand screws $b$.

To the screws $b$ are secured the curved levers $c$, which are connected with a sliding collar, F, placed on the hub C, by connecting rods or links $d$. The collar F is circumferentially grooved to receive the forked arm by which it is slid along the elongated hub C.

When the collar is moved toward the split band E, the screws $b$ are turned through the action of the connecting-rods $d$ and levers $c$ in the direction required to draw together the split band E upon the drum D, and as the drum D revolves continually with the shaft A, when the band E is tightened down upon the drum, it will revolve with the drum and carry with it the pulley B. When it is desired to stop the pulley, the collar F is moved backward, thereby turning the screws $b$ in the opposite direction and releasing the split band E from the drum D, when the pulley will no longer be revolved by the shaft, and the split band E and the collar F and parts attached thereto, being connected with the pulley, will also remain stationary.

In some instances the drum D will be connected with the shaft A with a slot-and-feather or equivalent device, so that it may be withdrawn from the split band E when desirable.

Having thus described my invention, what I claim as new, and desire to secure by Letters Patent, is—

1. The combination, with a pulley, of clutching mechanism carried by said pulley, substantially as described, whereby provision is made for allowing the clutching mechanism to remain at rest with the pulley when said mechanism is disengaged, as set forth.

2. The combination, with the pulley B and friction-drum D, of clutching mechanism connected with and carried by the pulley, substantially as herein shown and described.

3. The combination, with the pulley B, of the friction-drum D, secured to the driving-shaft A independently of the pulley, and clutching mechanism carried by the pulley and arranged to engage the periphery of the drum, substantially as herein shown and described.

4. The combination, with the pulley B, placed loosely on the shaft A, of the friction-drum D, secured to the shaft, the split band E, carried by the pulley, and means, substantially as shown and described, for bringing the band into frictional contact with the drum D.

5. The combination, in a friction-pulley, of a pulley, B, mounted loosely on the shaft A, the friction-drum D, fixed to the shaft, and the split friction-band E, right and left hand screws $b$, the levers $c$, connecting-rods $d$, and sliding collar F, carried by the pulley, as shown and described.

JAMES E. HUNTER.

Witnesses:
S. PROCTOR THAYER,
AUSTIN BOND.